United States Patent
Filippi et al.

(10) Patent No.: US 7,727,493 B2
(45) Date of Patent: Jun. 1, 2010

(54) PLATE-TYPE HEAT EXCHANGER

(75) Inventors: Ermanno Filippi, Castagnola (CH);
Enrico Rizzi, Casnate con Bernate (IT);
Micro Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 776 days.

(21) Appl. No.: 10/597,234

(22) PCT Filed: Apr. 1, 2005

(86) PCT No.: PCT/EP2005/003439

§ 371 (c)(1),
(2), (4) Date: Jul. 17, 2006

(87) PCT Pub. No.: WO2005/115604

PCT Pub. Date: Dec. 8, 2005

(65) Prior Publication Data
US 2007/0261831 A1    Nov. 15, 2007

(30) Foreign Application Priority Data
May 24, 2004    (EP)    .................................. 04012231

(51) Int. Cl.
*B01J 8/02* (2006.01)
*F28F 9/22* (2006.01)
*F28D 7/00* (2006.01)

(52) U.S. Cl. ....................... 422/200; 422/188; 422/148; 422/198; 165/158; 165/163; 165/168

(58) Field of Classification Search ................. 422/188, 422/198, 148, 200; 165/158, 163, 168
See application file for complete search history.

(56) References Cited

U.S. PATENT DOCUMENTS 5,030,789 A * 7/1991 Dang Vu et al. ............. 585/503
5,035,867 A * 7/1991 Dang Vu et al. ............. 422/200

(Continued)

FOREIGN PATENT DOCUMENTS
WO    WO 03/035241 A1    5/2003

(Continued)

*Primary Examiner*—Walter D Griffin
*Assistant Examiner*—Huy-Tram Nguyen
(74) *Attorney, Agent, or Firm*—Akerman Senterfitt

(57) ABSTRACT

A plate-shaped heat exchanger (20, 120) for a heat exchange unit (40) of a chemical reactor (60), that advantageously presents a thermal insulation obtained in an unusually simple and reliable manner, has a substantially flattened box-like structure (22), with a substantially parallelepiped, rectangular configuration, defining an internal chamber (24), and comprises an inlet connection (28) and an outlet connection (29) of a heat exchange operating fluid into and from said chamber (24), and a distributor pipe (10, 110) of said operating fluid inside said chamber (24), extended in said structure (22) at a long side (22a) of it, said distributor pipe (10, 110) comprising a first tube (30, 130) and a second tube (32, 132), positioned one inside the other, between said tubes, respectively external tube (30) and internal tube (32, 132), an interspace (30a) being defined in fluid communication, on one side, with said chamber (24) through a plurality of openings (26) provided in the external tube (30, 130) of said distributor pipe (10, 110), and, on the other side, with the internal tube (32, 132) of the same distributor pipe (10, 110), said internal tube (32, 132) being hydraulically connected to said inlet connection (28) for the heat exchange operating fluid.

22 Claims, 3 Drawing Sheets

U.S. PATENT DOCUMENTS

| | | | |
|---|---|---|---|
| 5,047,217 A * | 9/1991 | Dang Vu et al. | 422/200 |
| 6,631,757 B2 * | 10/2003 | Herzog et al. | 165/167 |
| 2002/0174978 A1 | 11/2002 | Beddome et al. | |
| 2004/0266893 A1 * | 12/2004 | Filippi et al. | 518/726 |
| 2005/0095184 A1 * | 5/2005 | Guarino | 422/198 |

FOREIGN PATENT DOCUMENTS

WO  WO 2004/003452 A1  1/2004

* cited by examiner

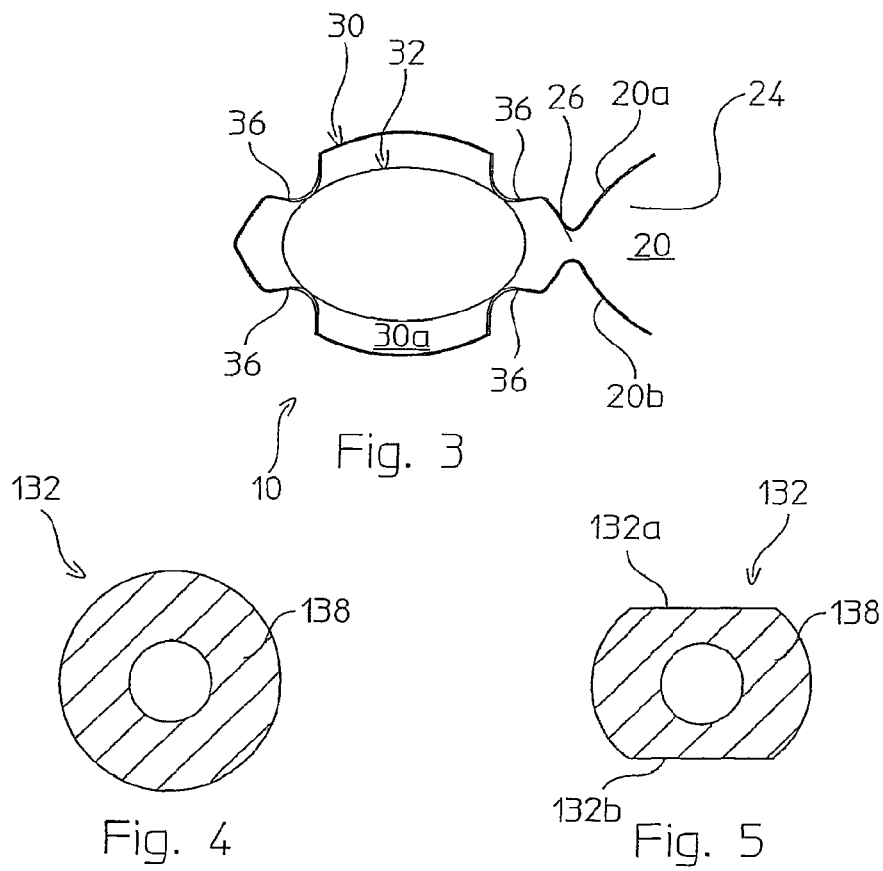
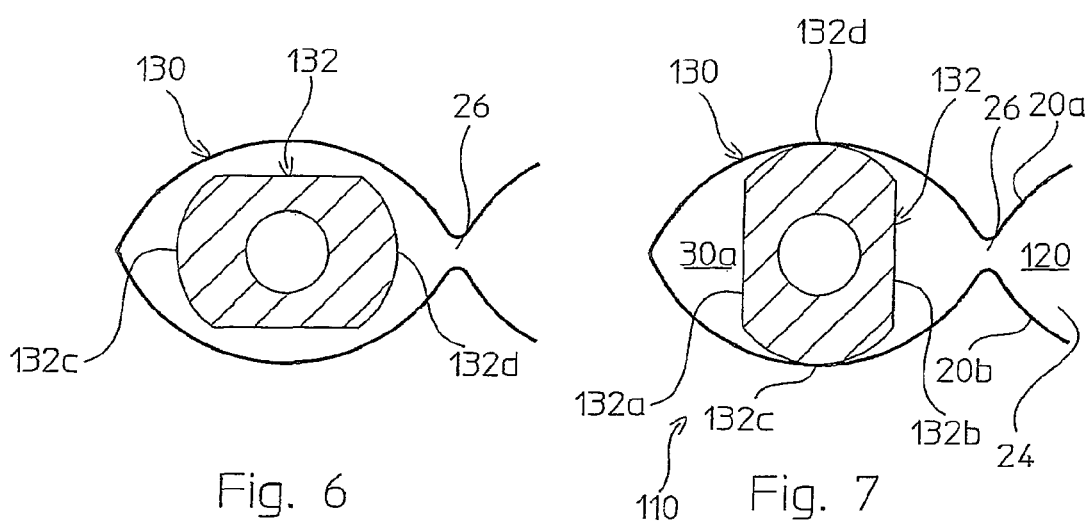

PLATE-TYPE HEAT EXCHANGER

FIELD OF APPLICATION

The present invention, in its most general aspect, relates to a heat exchanger for a heat exchange unit of a chemical reactor.

In particular, the invention relates to a plate-shaped heat exchanger having a substantially box-like flattened structure, with a substantially parallelepiped, rectangular configuration, defining an internal chamber, and comprising an inlet connection and an outlet connection for a heat exchange operating fluid into and from said chamber and a distributor pipe of said operating fluid in said chamber, extended in said structure at a long side of it.

The invention also relates to a heat exchange unit comprising a plurality of plate-shaped heat exchangers of the aforesaid type.

PRIOR ART

It is known that in order to obtain optimal completion of exothermic or endothermic chemical reactions, such as, for example, synthesis reactions of ammonia, methanol, formaldehyde or, respectively, styrene, heat must be removed, or respectively supplied to a reaction environment, generally to a catalytic bed, in order to control the temperature in a restricted range around a previously calculated theoretic value.

It is also known that, for this purpose, a heat exchange unit is used, comprising a plurality of plate-shaped heat exchangers, said unit being arranged in said catalytic bed; the plate-shaped heat exchangers are crossed internally by a heat exchange operating fluid for example in a radial or in an axial direction.

The heat exchange operating fluid, entering from an inlet connection, supplies a distributor pipe; the operating fluid is then collected by a collector pipe, that terminates in an outlet connection.

It is known that for good heat exchange unit performance it is preferable that the aforesaid distributor pipes and collector pipes are thermally insulated, in order to prevent any so-called parasitic heat exchange between the heat exchange operating fluid that crosses the aforesaid pipes and the reagent fluid outside the plate-shaped heat exchangers.

Such a parasitic heat exchange provokes, for example in an exothermic reaction, an undesirable heating of the heat exchange operating fluid that flows through the distributor pipe, creating a not uniform temperature field along the total length of the long sides of the plate-shaped heat exchanger, whose length can sometimes be considerable, and consequently creating a not uniform temperature field in the catalytic bed. In other words, the parasitic heat exchange influences the heat exchange operating fluid entering the plate-shaped heat exchanger so that the fluid has different temperatures at different heights of the plate-shaped heat exchanger, thus worsening the reaction efficiency.

Furthermore, as far as the parasitic heat exchange is concerned, the influence of the flow rate must also be considered. In the case of an exothermic reaction, the heat exchange operating fluid in the distributor pipe is heated by the fluid outside the plate-shaped heat exchanger as it progressively proceeds. This effect is stronger the further you leave from the inlet connection of the distributor pipe, or from the outlet connection of the collector pipe, because of the reduction in flow rate of fluid crossing the pipe in question.

Therefore, because of said reduction in the flow rate of the heat exchange operating fluid flowing inside the distributor and collector pipes, a not uniform heat exchange occurs in the catalytic bed areas surrounding these pipes, preventing the desired temperature control in these areas.

In prior art, in order to achieve this thermal insulation, it has been proposed to cover the distributor and collector pipes, with a layer of a low thermal conductivity coating. Generally ceramic coatings are used, with a base of substances such as zirconium, yttrium, alumina, cerium, magnesium oxides and their mixtures.

Plate-shaped heat exchangers of a chemical reactor heat exchange unit carried out according to the aforesaid schematic description provides an excellent thermal insulation that perfectly answers the purpose. On the contrary, in many cases, it has proved to be even too perfected against the operative needs for a correct working of the heat exchanger.

SUMMARY OF THE INVENTION

The problem underlying the present invention is that of providing a plate-shaped heat exchanger for a heat exchange unit of a chemical reactor able to satisfy the aforesaid requirement, while at the same time simplifying the way of doing things and relative aforesaid drawbacks described in relation to the prior art.

This problem is solved, according to the present invention, by a heat exchanger of the aforesaid type, and characterised in that said distributor pipe comprises a first and a second tube, positioned one inside the other, between said tubes, external and internal respectively, a interspace being defined in fluid communication, on one side, with said chamber through a plurality of openings provided in the external tube of said distributor pipe, and, on the other side, with the internal tube of the same distributor pipe, said internal tube being hydraulically connected to said inlet connection for the heat exchange operating fluid.

Further characteristics and the advantages of the plate-shaped heat exchanger for a heat exchange unit of a chemical reactor according to the present invention will be apparent from the description of an embodiment thereof, written below with reference to the attached drawings, provided as an indicative and non-limiting example.

BRIEF DESCRIPTION OF THE DRAWING

FIG. 3 schematically represents a section view from above of a detail of FIG. 2.

FIG. 4 schematically represents a section view from above of an element from which it is possible to obtain a component of a variant embodiment of a plate-shaped heat exchanger according to the invention.

FIG. 5 schematically represents a section view from above of the component of plate-shaped heat exchanger obtained from the element of FIG. 4.

FIG. 6 schematically represents a section view from above of a distributor pipe included in the variant embodiment of the heat exchanger, the component of FIG. 5 being used in said distributor pipe, shown during an assembly step.

FIG. 7 schematically represents a section view from above of the distributor pipe of FIG. 6, in a working position.

DETAILED DESCRIPTION OF AN EMBODIMENT OF THE INVENTION

Figure 1:
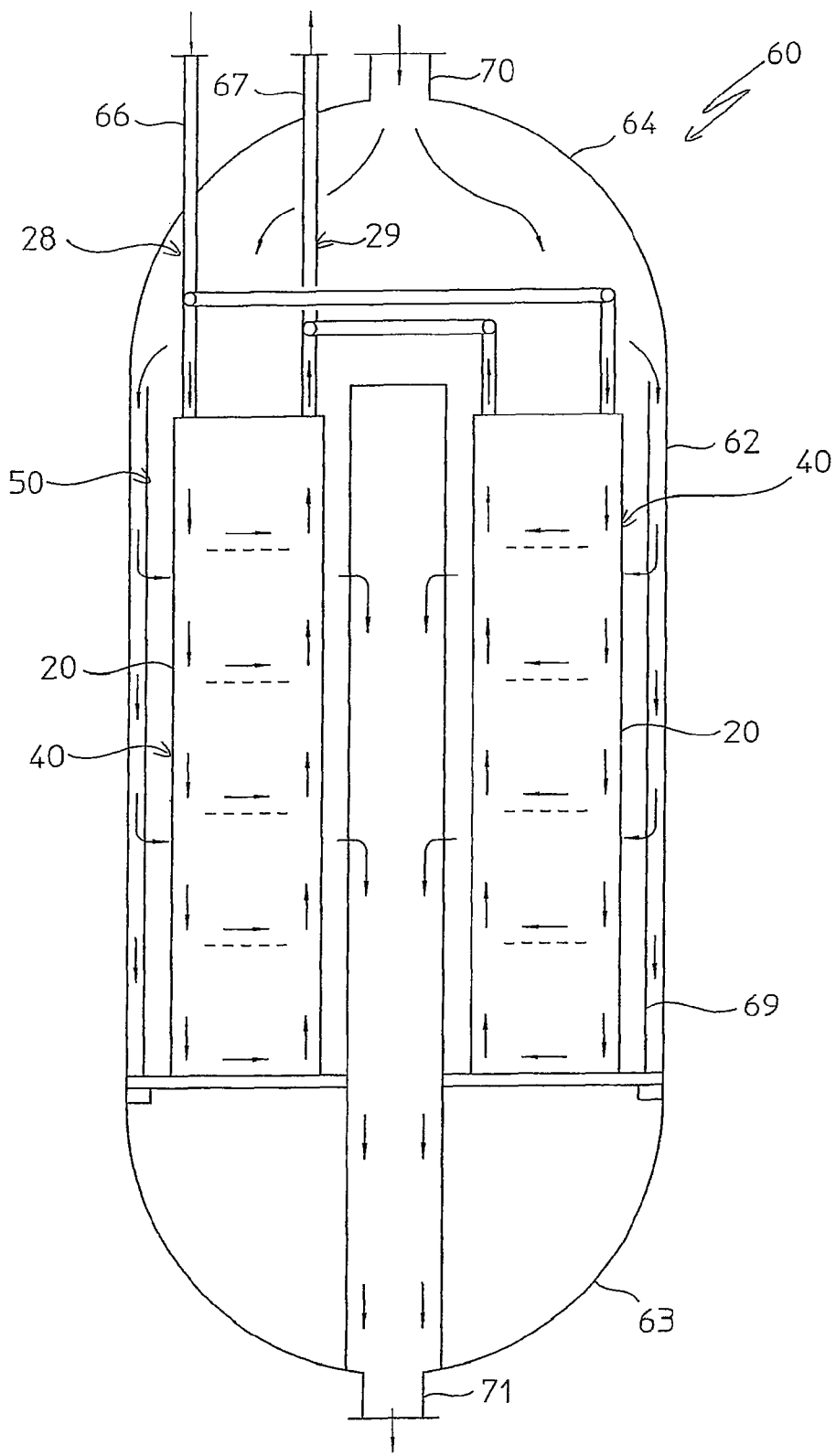
FIG. 1 schematically represents a lengthwise section view of a chemical reactor equipped with a heat exchange unit, comprising plate-shaped heat exchangers according to the present invention.
Figure 2:
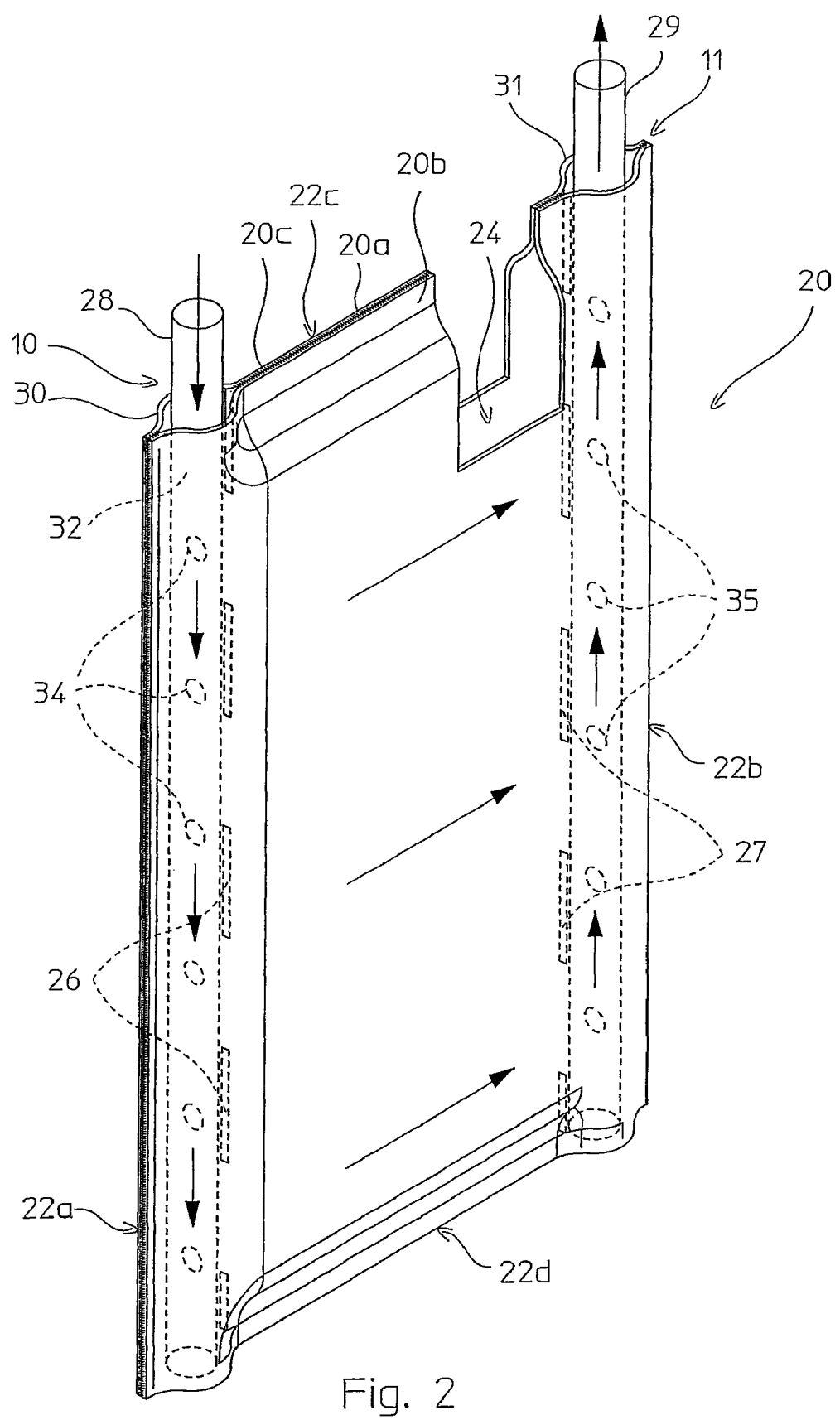
FIG. 2 schematically represents an enlarged view in perspective of a plate-shaped heat exchanger of the heat exchange unit of FIG. 1.

In reference to the figures, a plate-shaped heat exchanger is shown, according to the present invention and globally indicated with 20, for a heat exchange unit 40 of a chemical reactor 60.

The chemical reactor 60 comprises a cylindrical shell 62, closed at the opposite ends with respective bottoms, lower 63 and upper 64. Inside the shell 62 it is provided a reaction environment 69 comprising an annular catalytic bed 50—per se known—open at the top, and with the lateral walls having holes for a reagent fluid crossing thereof, in a radial or in an axial-radial direction.

In the reaction environment 69, and more precisely inside the catalytic bed 50, the heat exchange unit 40—in a per se conventional manner—is supported, destined to be immersed in a mass of an appropriate catalyst, not shown in the drawing. Said heat exchange unit 40 has a substantially cylindrical configuration and comprises a plurality of plate-shaped heat exchangers 20, placed side by side next to each other in a radial arrangement.

Each plate-shaped heat exchanger 20 comprises a substantially box-like flattened element 22, with parallelepiped, rectangular configuration, defining an internal chamber 24, and comprises an inlet connection 28 and an outlet connection 29 for a heat exchange operating fluid, into and from said chamber 24.

A distributor pipe 10 and a conductor pipe 11 are provided at long sides 22a and 22b of said element 22, in fluid communication, from one side, with said chamber 24 through, respectively, a plurality of inlet 26 and outlet 27 openings and, on the other side, with the outside of the plate-shaped heat exchanger 20 through, respectively, said inlet 28 and said outlet 29 connections.

It should be noted that, as an alternative, it may be provided only one of the two aforesaid distributor 10 and collector pipes.

The short sides of element 22 are indicated with 22c and 22d. More in particular, each plate-shaped heat exchanger 20 is preferably constituted by a pair of metal plates 20a and 20b in juxtaposition, reciprocally united, in a pre-established spaced out relationship, by means of perimetric welding 20c, so that said chamber 24 is defined between them.

The inlet 28 and outlet 29 connections of said heat exchange operating fluid are in turn connected with the openings 66 and 67, respectively, provided on the upper bottom 64 of the reactor 60.

According to one aspect of the present invention, said distributor pipe 10 and said collector pipe 11 each comprise a first tube 30, 31 and second tube 32, 33, one being positioned inside the other. In particular, the distributor pipe 10 and the collector pipe 11 comprise an external tube, 30 and 31 respectively, in fluid communication with said chamber 24 through said plurality of respective inlet openings 26 and outlet openings 27, and an internal tube 32 and 33, respectively.

The internal tube, 32 and 33, is positioned inside said external tube 30 and 31, respectively, in a manner to define with it a interspace (the interspace between the internal tube 32 and the external tube 30 is indicated with 30a in the figures). The internal tube 32 and 33 is in fluid communication with the respective interspace through a plurality of further openings 34 and 35 distributed on said internal tube 32 and 33, respectively, and it is in fluid communication with the outside of the plate-shaped heat exchanger 20 through said respective inlet connection 28 and outlet connection 29 for said heat exchange operating fluid.

Preferably the external tubes 30 and 31 and the internal tubes 32 and 33 are substantially rectilinear.

In the example shown in FIG. 3, the internal tube 32, for example with smooth walls, has a substantially oval section in the portion under the inlet connection 28, and it is inserted into the external tube 30, that is generally substantially spindle shaped, in other words, having a form similar to the intersection of two circles with equal diameters and with a distance between the centres that is less than said diameter. For example, the internal oval tube 32, may be made by pressing a circular tube or by using tubes with an ellipsoid section, available on the market. It should be noted that alternatively, as internal tube 32, a simple circular section tube can also be used, that therefore is not ovalized.

The openings 34 provided on the internal tube 32 are generally circular and have such a diameter to ensure good distribution of heat exchange operating fluid. Advantageously, the diameter of the openings 34 can vary along the length of the internal tube 32, to balance the loss of pressure of the fluid flowing in the internal tube 32.

The external dimensions of the internal tube 32 is slightly smaller than the space enclosed by the external tube 30. In other words, the interspace 30a is formed between said spindle-shaped external tube 30 and said oval-shaped internal tube 32. More precisely, the internal tube 32 and the external tube 30, arranged substantially in coaxial position, are reciprocally constrained in the direction cross-wise to the axis.

The cross-wise tie is constituted by opposite ridges 36 on the internal surface of the external tube 30, made, for example, by embossing the external tube 30 itself with a punch that is moved from the outside towards the external tube 30. The ridges 36 are preferably four in number, for example, all at the same height of the external tube 30, preferable at the four minimum distance zones between the oval-shaped internal tube 32 and the spindle-shaped external tube 30. It should be noted that these sets of four ridges 36 are preferably repeated at different heights of the external tube 30, for example every meter of the external tube 30. Alternatively, the ridges 36 are provided at different heights of the external tube 30, appropriately staggered, in a substantially helicoidal arrangement.

Naturally, advantageously, the collector pipe structure 11 is completely similar to the aforesaid structure, that relates to the distributor pipe 10.

FIGS. 4, 5, 6 and 7 show a plate-shaped heat exchanger 120, according to a variant embodiment of the present invention, in particular being represented a distributor pipe 110 of said plate-shaped heat exchanger 120.

It must be noted that, in said variant, the elements that are structurally or functionally similar to those of the plate-shaped heat exchanger 20 are indicated with the same reference numeral and the detailed description thereof is not repeated for the sake of brevity.

The plate-shaped heat exchanger 120 comprises the distributor pipe 110 that includes an external tube 130 in fluid communication with said chamber 24 through said plurality of inlet openings 26, and an internal tube 132 positioned inside said external tube 130 and in fluid communication with the outside of the plate-shaped heat exchanger 120 through said inlet connection 28 for said heat exchange operating fluid, on said internal tube 132 being distributed a plurality of generally, circular openings 34.

In this case as well, the internal tube 132 has substantially oval external dimensions and is inserted inside the external tube 30, having a substantially spindle-shaped section.

However, in this variant, the internal tube 132 is made starting from a circular tube, equipped with finning 138 (FIG. 4), from which the finning 138 is removed (FIG. 5), at least partially, at two opposite sides, for example by a milling step that creates two flat opposite and parallel faces 132a and 132b.

In the rest of the description and in the following claims, the term "finning" generally refers to a projecting part that protrudes from the external surface of said circular tube along its perimeter, preferably said projecting part is annular disc-shaped.

The external dimensions of the internal tube 132 is slightly smaller than the space enclosed by the external tube 130. In other words, an interspace 30a is formed between said external spindle-shaped tube 130 and said internal oval-shaped tube 132: more precisely, by positioning the internal oval-shaped tube 132 coaxially with the external spindle-shaped tube 30, the minimum distance between the internal tube 132 and the external tube 130 is approximately a few millimeters.

The internal tube 132 and the external tube 130 are reciprocally constrained in the direction cross-wise to the axis.

The cross-wise tie is constituted by a restrained joint. More precisely, the internal tube 132 is inserted inside the external tube 130 with the two flat faces 132a and 132b positioned substantially parallel to the direction of the wider dimension of the spindle of the external tube 130 (FIG. 6), or in other words, parallel to the chord defined by the two intersecting points of the two arcs of circumference that form the spindle. After said insertion, the internal tube 132 is rotated preferably at an angle of about 90° (FIG. 7), until the opposite zones 132c and 132d of the internal tube 132 that are still completely finned are blocked against internal walls of the external tube 130, preferably in orthogonal direction to the aforesaid wider dimension of the spindle.

Naturally, advantageously, a collector pipe structure that can be used in the heat exchanger 120 is completely similar to the aforesaid structure, that relates to the distributor pipe 110.

The operation of the plate-shaped heat exchanger of a heat exchange unit of a chemical reactor, according to the present, invention is described below.

A reagent fluid enters the chemical reactor through an opening 70 in the upper bottom 64 and reaches the catalytic bed 50. Here the plurality of plate-shaped heat exchangers 20 supply or absorb heat respectively according to endothermic or exothermic reaction, assisting the chemical reaction under way in the catalytic bed 50. The products of the reaction exit from the reactor through an opening 71 of the lower bottom 63.

Each plate-shaped heat exchanger 20 is supplied with a heat exchange operating fluid from an inlet opening 66, through the inlet connection 28 until it reaches the distributor pipe 10.

Said heat exchange operating fluid, after it has crossed the heat exchanger chamber 24 internally, is collected by the collector pipe 11 and, through the outlet connection 29, reaches an outlet opening 67 for the heat exchange operating fluid.

The thermal insulation of the distributor pipe 10 and collector pipe 11 of the plate-shaped heat exchanger of the invention is obtained due to the interspace formed between the internal tube (32, 33) and the external tube (30, 31) of said distributor and collector pipes.

As stated previously, the internal tube is inserted inside the external tube and is constrained in it in the cross-wise position: this is performed above all to prevent any damage caused by internal tube vibrations against the internal walls of the external tube.

It is worth repeating that the internal tube must freely enter the external tube, due to the fact that, since both elements are generally made in austenitic steel, if a certain clearance is not available, it can easily happen that seizure will occur between the two tubes during the insertion of the internal tube inside the external tube.

It should also be emphasized that, using ellipse-shaped cross-section tubes as internal tube, the spindle shape of the external tube is exploited in a optimal way.

The principle advantage achieved by the plate-shaped heat exchanger for a heat exchange unit of a chemical reactor, according to the present invention, is the fact that thermal insulation is obtained in an unusually simple and reliable manner.

Another considerable advantage is the fact that the external surface of the external tube of the distributor and collector pipes is used completely as a heat exchange area between the heat exchange operating fluid flowing in the plate-shaped heat exchanger and the reaction fluid of the catalyst. In fact, by directing the openings provided in the internal tube towards the external edge of the plate-shaped heat exchanger, the heat exchange operating fluid, in order to flow towards the interior of said plate-shaped heat exchanger, must flow through the interspace surrounding the internal tube, in this manner exchanging heat correctly with the reaction fluid outside the plate-shaped heat exchanger and at the same time protecting the heat exchange operating fluid inside the internal tube.

Obviously, in order to satisfy specific and incidental needs, a person skilled in the art can apply numerous variants and modifications on the plate-shaped heat exchanger described above, all of which however, remain within the scope of protection of the present invention as defined in the following claims.

The invention claimed is:

1. Plate-shaped heat exchanger (20, 120) for a heat exchange unit (40) of a chemical reactor (60), having a substantially box-like flattened structure (22), with a substantially parallelepiped, rectangular configuration, defining an internal chamber (24), and comprising an inlet connection (28) and an outlet connection (29) for a heat exchange operating fluid into and from said chamber (24), and a distributor pipe (10, 110) of said operating fluid in said chamber (24), extended in said structure (22) at a long side (22a) of it, characterised in that said distributor pipe (10, 110) comprises a first tube (30, 130) and second tube (32, 132), positioned one inside the other, between said tubes, respectively external tube (30, 130) and internal tube (32, 132), an interspace (30a) being defined in fluid communication, on one side, with said chamber (24) through a plurality of openings (26) provided in the external tube (30, 130) of said distributor pipe (10, 110), and, on the other side, with the internal tube (32, 132) of the same distributor pipe (10, 110), said internal tube (32, 132) being hydraulically connected to said inlet connection (28) for the heat exchange operating fluid.

2. Plate-shaped heat exchanger (20, 120) according to claim 1, characterised in that the interspace (30a) communicates with the internal tube (32, 132) of the distributor pipe (10, 110) through a plurality of further openings (34) provided in it.

3. Plate-shaped heat exchanger (20, 120) according to claim 2, characterised in that said further openings (34) provided on the internal tube (32, 132) are circular.

4. Plate-shaped heat exchanger (20, 120) according to claim 3, characterised in that the diameter of the further openings (34) varies along the length of the internal tube (32, 132).

5. Plate-shaped heat exchanger (20, 120) according to claim 2, characterised in that said openings (26) and said further openings (34) are distributed along all the length of the respective external (30, 130) and internal tubes (32, 132).

6. Plate-shaped heat exchanger (20, 120) according to claim 1, characterised in that said external tube (30, 130) and said internal tube (32, 132) are substantially rectilinear.

7. Plate-shaped heat exchanger (20, 120) according to claim 1, characterised in that said internal tube (32, 132) has a substantially oval section.

8. Plate-shaped heat exchanger (20, 120) according to claim 1, characterised in that said external tube (30, 130) has a substantially spindle-shaped section.

9. Plate-shaped heat exchanger (20, 120) according to claim 1, characterised in that said internal tube (32, 132) has circular section.

10. Plate-shaped heat exchanger (20, 120) according to claim 1, characterised in that it is equipped with a collector pipe (11) for the operating fluid, extended at the other long side (22*b*) of said structure (22) and comprising a first (31) and a second tube (33), positioned one inside the other, between said tubes, respectively external (31) and internal (33), an interspace being defined in fluid communication, on one side, with said chamber 24 though a plurality of openings (27) provided in the external tube (31) of said collector pipe (11) and, on the other side, with the internal tube (33) of the same collector pipe (11), said internal tube (33) being hydraulically connected to said heat exchange operating fluid outlet connection (29).

11. Method for carrying out a plate-shaped heat exchanger (20, 120) according to claim 1, characterised in that said internal tube (32, 132) and said external tube (30, 130), substantially positioned co-axially, are reciprocally constrained in the cross-wise direction to the axis.

12. Method according to claim 11, characterised in that said internal tube (132) is made starting from a circular tube, equipped with finning (138), said finning (138) being removed, at least partially, at two opposite sides.

13. Method according to claim 12, characterized in that said finning removal is performed by a milling step to create two opposite and parallel flat faces (132*a*, 132*b*).

14. Method according to claim 13, characterised in that said internal tube (132) is inserted inside the external tube (130), with the two flat faces (132*a*, 132*b*) positioned substantially parallel to the direction of the wider dimension of the spindle of the external tube (130), said internal tube (132) then being rotated at an angle of about 90°, until opposite sides (132*c*, 132*d*) of the internal tube (132) that are still completely finned, are blocked against internal walls of the external tube (30).

15. Plate-shaped heat exchanger (20) carried out according to the method of claim 11, characterised in that the cross-wise tie is constituted by opposite ridges (36) of the internal surface of the external tube (30).

16. Plate-shaped heat exchanger (20) according to claim 15, characterised in that the said ridges (36) are four in number, all positioned at the same height of the external tube (30).

17. Plate-shaped heat exchanger (20) according to claim 16, characterised in that said set of four ridges (36) are repeated at different heights of the external tube (30).

18. Plate-shaped heat exchanger (20) according to claim 15, characterised in that said ridges (36) are arranged at different heights of the external tube (30), appropriately staggered in a substantially helicoidal arrangement.

19. Plate-shaped heat exchanger (120) carried out according to the method of claim 12, characterised in that the cross-wise tie is constituted by a restrained joint.

20. Heat exchange unit (40) of a chemical reactor (60), characterised in that it comprises a plurality of plate-shaped heat exchangers (20, 120) according to claim 1.

21. Chemical reactor (60) of the type comprising a cylindrical shell (62) closed at the opposite ends with respective bottoms, lower (63) and upper (64), inside the shell (62) a reaction environment (69) being provided, comprising a catalytic bed (50) wherein a heat exchange unit (40) is positioned, characterised in that said heat exchange unit (40) comprises a plurality of plate-shaped heat exchangers (20, 120) according to claim 1.

22. Chemical reactor (60) according to claim 21 characterised in that said heat exchange unit (40) has a substantially cylindrical configuration and comprises a plurality of said plate-shaped heat exchangers (20, 120), place side by side next to each other in a radial arrangement.

* * * * *